Patented Aug. 29, 1950

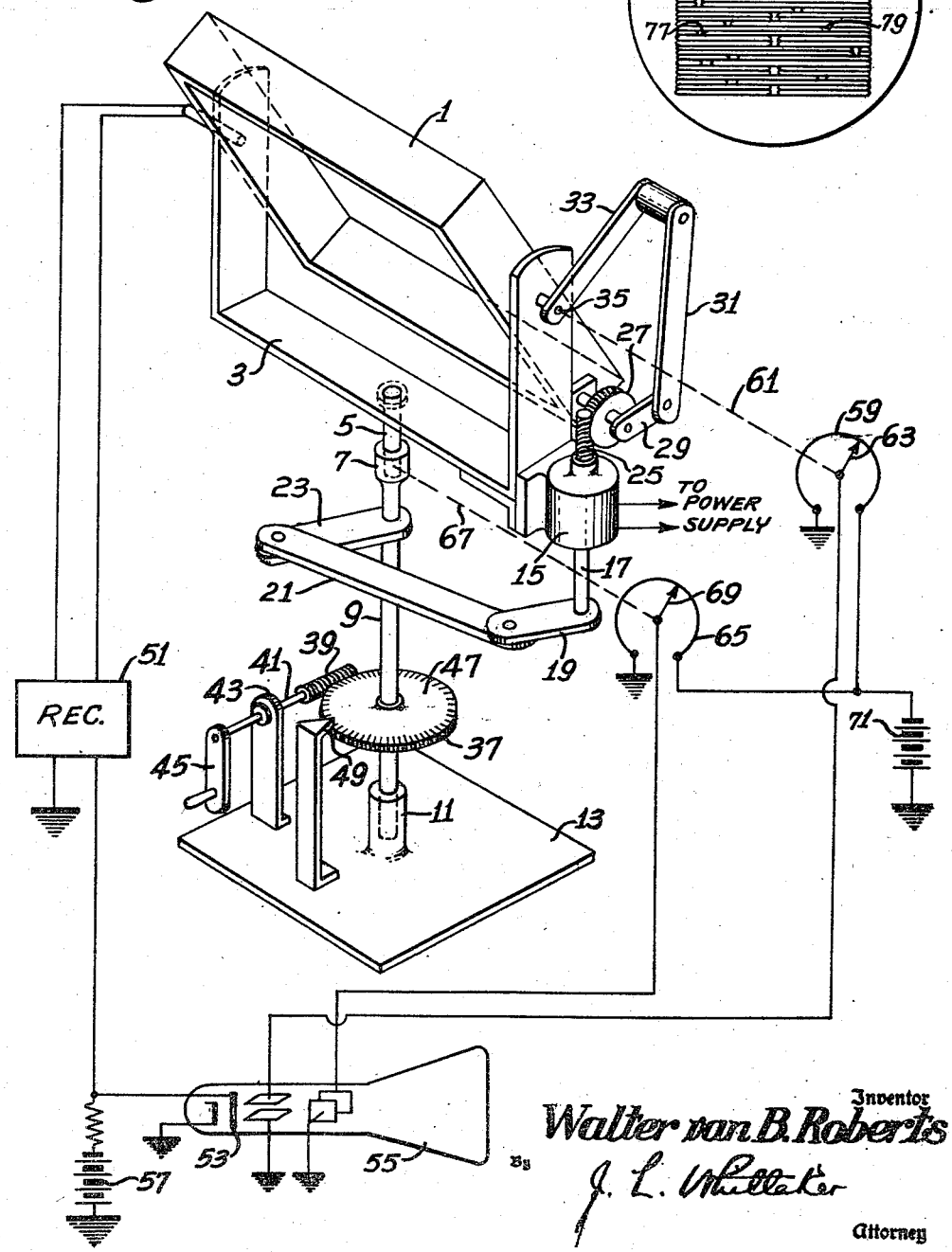

2,520,693

UNITED STATES PATENT OFFICE 2,520,693

DIRECTION FINDER

Walter van B. Roberts, Princeton, N. J., assignor to Radio Corporation of America, a corporation of Delaware Application April 22, 1948, Serial No. 22,599

3 Claims. (Cl. 343—113)

This invention relates to improvements in radio direction finders, and more particularly to direction finders for use with signals subject to multipath propagation or "night effect."

It is well known that radio waves of certain lengths travel over two or more paths under certain conditions of the ionosphere, and that such waves, especially when arriving at steep elevation angles, introduce so-called "polarization errors" in the indications of prior art types of direction finders. The effect of polarization error is to produce incorrect and frequently unsteady bearing indications, which sometimes have no apparent relationship to the actual direction of arrival of the waves.

The principal object of the present invention is to provide methods and means for obtaining substantially correct bearing indications under severe "night effect" conditions.

More specifically, it is an object of this invention to provide methods and means for sampling the apparent bearings of a radio signal at various elevation angles, and selecting therefrom the one which is most probably correct.

Another object of the invention is to provide methods and means for evaluating the probable accuracy of bearing indications in general under currently prevailing conditions.

The invention will be described with reference to the accompanying drawing, wherein:

Figure 1 is a schematic diagram of a presently preferred embodiment of the invention, and Figure 2 shows a typical indication provided by the system of Figure 1.

The direction finder shown in Figure 1 includes a loop 1 mounted in trunnions on a fork 3 for rotation about a horizontal axis. The fork 3 is supported on a vertical shaft 5 which extends into, and is supported by, a bearing 7 on a vertical shaft 9. The fork 3 is rotatable about the vertical axis of the shafts 5 and 9. The lower end of the shaft 9 extends into a cup bearing 11 on a base plate 13.

A motor 15 is secured to the trunnion member 3, and one end of its rotor shaft 17 is provided with a crank 19. A connecting rod 21 extends from the end of the crank 19 to a crank 23 which is secured to the shaft 9. The length of the crank 23 is considerably greater than that of the crank 19.

The shaft of the motor 15 is also provided with a worm 25 engaging a worm wheel 27. The worm wheel 27 is connected to a crank 29, coupled through a connecting rod 31 to a longer crank 33. The crank 33 is secured to the horizontal shaft 35 supporting the loop 1.

A worm wheel 37 is secured to the vertical supporting shaft 9, in engagement with a worm 39 on a shaft 41. The shaft 41 is supported in a bearing member 43 secured to the base plate 13. A manually operable crank 45 is fastened to the shaft 41. The worm wheel 37 carries a scale disk 47 calibrated in degrees, and a pointer 49 for cooperation therewith is supported on the base plate 13.

The terminals of the loop 1 are connected to a radio receiver 51 whose output is supplied to the beam intensity control electrode 53 of a cathode ray oscilloscope tube 55. The electrode 53 may be normally biassed, as by a source 57, so that the beam intensity is not sufficient to produce a visible trace on the screen of the tube 55.

A variable voltage divider 59 is produced with its control shaft coupled to the horizontal loop shaft 35, as indicated schematically by the dash line 61. The body of the voltage divider 59 may be supported on the fork member 3, so that the position of the movable contact arm 63 on the resistance element depends upon the angular position of the loop 1 about its horizontal axis of rotation.

A second voltage divider 65 has its control shaft coupled to the vertical loop shaft 5, as indicated by the dash line 67. The body of the voltage divider 65 is supported on or coupled to the shaft 9, so that the position of the movable contact arm 69 on the resistance element depends upon the relative angular displacement between the loop shaft 5 and the supporting shaft 9.

The voltage dividers 59 and 65 are both connected across a D.-C. source 71, and their movable contact arms 63 and 69 respectively are connected to the horizontal and vertical deflection elements of the cathode ray tube 55.

In the operation of the described direction finder, the motor 15 runs continuously to rock the fork 3, and with it the loop 1, back and forth in azimuth through an angle of, for example ±30° from its mean azimuth at a rate of perhaps 5 oscillations per second. At the same time, the loop is swung in elevation, from zero, with its null axis horizontal, to say 60°. Owing to the worm and worm wheel arrangement 25, 27, the motion in elevation is much slower than that in azimuth, say once every ten seconds. The foregoing rates are given only by way of example, and either may be varied considerably. Thus every possible combination of azimuth and elevation (within approximately one degree) included in the total solid angle swept by the null axis of the loop will be covered every ten seconds.

The voltage at the movable arm 63 of the voltage divider 59 at any instant will be proportional to the elevation angle of the loop axis. Similarly, the voltage at the arm 69 of the voltage divider 65 will be determined by the azimuth of the loop axis, referred to the angular position of the shaft 7 and the scale 47. Since these voltages are applied to the vertical and horizontal deflection elements respectively of the tube 55, the cathode ray beam will be deflected to strike the screen at a point which corresponds to the instantaneous position of the antenna.

The cathode ray beam scans the face of the tube 55 in a more or less square pattern of horizontal lines, displaced vertically, like a television raster. The center of each line corresponds to the mean position in azimuth of the loop 1. Since the beam is normally biassed off by the source 57, no visible trace appears on the screen of the tube 55 except when there is more than a certain minimum output from the receiver 51.

The receiver is tuned to the frequency of operation of the transmitter whose direction is to be determined. Wave energy from said transmitter may arrive at the loop 1 by three paths: (1) more or less parallel to the earth's surface, as a "ground wave," (2) by way of reflection from the ionosphere, as a "sky wave," and (3) by reflection from the ground, or a combination of reflections from the ionosphere and the earth.

In general, the voltage induced in the loop will not go to a minimum, in the presence of two or more of these types of wave propagation, when the null axis of the loop is horizontal and pointed toward the transmitter. It may or may not be a minimum when the loop axis is pointed in some other horizontal direction.

The operation of the present invention is based on the assumption, which is ordinarily true, that the various "rays" of energy arriving at the loop have one characteristic in common, in that they all lie in the vertical plane including the transmitter and the direction finder. The resultant energy flow at the loop is therefore in this plane. Hence if the loop axis is aligned in elevation as well as in azimuth with the resultant ray at any moment, the resultant magnetic field of this ray will lie in the plane of the loop, whatever the polarization (plane or elliptical) of the field, and no voltage will appear across the loop terminals.

Transmission conditions usuall vary too rapidly to permit direction finding by manual adjustment of both elevation and azimuth of the loop axis. Therefore, it is preferable, as in the system of Figure 1, to cause the antenna to scan cyclically and rapidly through a large number or directions including that of the resultant ray. Since the loop will respond to waves arriving from substantially every direction except that of the null axis, the receiver 51 will provide output during the most of each scanning period.

The cathode ray will trace luminous lines on the screen of the tube 55, the lines being interrupted at points corresponding to the passage of the loop through a position wherein a null or minimum of signal is picked up.

See Figure 2, which shows a typical display on the face of the cathode ray tube 55. At some elevation angle there will be a null at the correct azimuth. In successive scans, this elevation may be different, with the result that several null indications will appear at the same azimuth, as illustrated. Other nulls may also be indicated at various other azimuths, particularly under severe "night effect" conditions. The latter indications, shown at 73, 75, 77 and 79, will vary in azimuth with variation in transmission conditions, and are thereby distinguishable from the true nulls, which will vary in elevation but remain at the same azimuth.

To provide a numerical indication of the bearing of the transmitter, the whole oscillating antenna assembly is rotated by means of the crank 45 to align the true null indications with a reference mark such as an arrowhead 71 on the screen of the tube 55, as shown in Figure 2. The mean azimuth of the oscillating loop then coincides with that of the arriving waves, and is indicated by the scale 47 against the pointer 49.

Although a specific embodiment of the invention has been described, using an oscillating loop antenna and a cathode ray indicator, it will be apparent without detailed explanation that other known types of directive antennas or antenna systems may be used, and other known methods of comparing successively presented azimuth indications may be employed.

The invention has been described as an improved direction finder for distinguishing true indications from false indications caused by "night effect" or polarization error. A directive antenna is moved in elevation, as well as in azimuth, and the azimuth indications at various elevation angles are compared to select the most probably correct azimuth.

I claim as my invention:

1. In a radio direction finder system including wave collector means subject to polarization error and having a null axis in the center of a solid angle of minimum responsiveness the method of determining the true azimuth of arrival of radio waves, which are transmitted from a remote station, substantially independently of said polarization error, comprising the steps of cyclically varying the direction of said null axis both in azimuth and in elevation to periodically orient said axis in substantially each direction within a prescribed second solid angle which is many times larger than said first-mentioned solid angle and includes a line to said remote station, identifying, according to both the azimuth and the elevation of said axis, each of a plurality of minimum responses to said waves which minimum responses occur respectively for different directions of elevation of said axis and may include some whose occurrences, because of polarization error effects, are not for the true direction in azimuth of said axis, and selecting as the true azimuth that azimuth on which, at different elevations, a preponderance of said signals is received.

2. In a radio direction finder adapted for use at frequencies exhibiting multipath transmission and night effects for determining the true azimuth of arrival of radio waves transmitted from a remote station, a loop antenna having a null axis in the center of a solid angle of minimum responsiveness, said loop being subject to polarization errors, means for cyclically rotating said loop both in azimuth and in elevation to periodically orient said axis in substantially each direction within a prescribed second solid angle which is many times larger than said first-mentioned solid angle and includes a line to said remote station; a radio receiver connected to said antenna, and indicator means connected to said receiver, said indicator means including a cathode ray oscilloscope tube, means deflecting the cathode ray beam of said tube horizontally and vertically respectively in synchronism with the motion of said loop in azimuth and elevation, and means responsive to the output of said receiver to correspondingly vary the intensity of said cathode ray beam.

3. In a radio direction finder adapted for use at frequencies exhibiting multipath transmission and night effects for determining the true azimuth of arrival of radio waves transmitted from a remote station, a loop antenna, said antenna being subject to polarization errors, means for cyclically varying the direction of the null axis of said loop both in azimuth and in elevation to periodically orient said axis in substantially each direction within a prescribed solid angle which is many times larger than a solid angle of minimum responsiveness of said loop antenna and includes a line to said remote station; a radio receiver connected to said antenna, and indicator means connected to said receiver, said indicator means including means displaying nulls which occur in the response of said receiver for different directions of elevation of said axis and which may include some whose occurrences, because of polarization error effects are not for the true direction in azimuth of said axis, the nulls being displayed as visible marks positioned with respect to a reference frame having azimuth and elevation coordinates in accordance with the corresponding positions of said directive axis within said first-mentioned solid angle, whereby the true azimuth of a signal source is indicated substantially independently of said polarization errors by a plurality of said marks lying in a single line representing said azimuth.

WALTER VAN B. ROBERTS.

REFERENCES CITED

The following references are of record in the file of this patent:

UNITED STATES PATENTS

| Number | Name | Date |
|---|---|---|
| 2,151,549 | Becker | Mar. 21, 1939 |
| 2,231,929 | Lyman | Feb. 18, 1941 |
| 2,304,446 | Eaton | Dec. 8, 1942 |
| 2,410,666 | Leck | Nov. 5, 1946 |